United States Patent [19]

Gross

[11] 3,954,721

[45] May 4, 1976

[54] ABSORBENT FIBERS AND PROCESS FOR THEIR PREPARATION

[75] Inventor: James Richard Gross, Lake Jackson, Tex.

[73] Assignee: The Dow Chemical Company, Midland, Mich.

[22] Filed: Sept. 9, 1974

[21] Appl. No.: 504,609

[52] U.S. Cl.................................. 526/14; 128/156; 128/284; 128/296; 264/184; 264/205; 264/340; 428/364; 8/115.5; 526/54; 526/55; 526/272
[51] Int. Cl.$^2$...................... C08F 8/44; A61L 15/00
[58] Field of Search................ 260/78.5 T; 264/184, 264/205, 340

[56] References Cited
UNITED STATES PATENTS

| | | | |
|---|---|---|---|
| 2,733,272 | 1/1956 | Horsley et al......................... | 260/615 |
| 2,933,460 | 4/1960 | Richter et al........................ | 260/2.1 |
| 2,988,539 | 6/1961 | Cohen et al.......................... | 260/78 |
| 3,085,986 | 4/1963 | Muskat.............................. | 260/31.8 |
| 3,245,933 | 4/1966 | Muskat.............................. | 260/29.6 |
| 3,398,092 | 8/1968 | Fields................................ | 210/24 |
| 3,642,726 | 2/1972 | Heilman......................... | 260/78.5 T |
| 3,810,468 | 5/1974 | Harper et al...................... | 128/156 |

*Primary Examiner*—John Kight, III
*Attorney, Agent, or Firm*—Benjamin G. Colley

[57] ABSTRACT

Water-insoluble, water-swellable fibers adapted to bind aqueous fluids such as body exudates are prepared by spinning fibers from an organic solvent solution of a copolymer of maleic anhydride with suitable vinyl aromatic monomers. The copolymer solution also contains a small amount of a polyfunctional cross-linking agent such as an adduct of glycerine with ethylene oxide and propylene oxide which reacts to cross-link and plasticize the copolymer chains when the fibers are heated and dried. The cross-linked copolymer fibers are then rendered hydrophilic and water-swellable by reaction with ammonia.

3 Claims, No Drawings

ABSORBENT FIBERS AND PROCESS FOR THEIR PREPARATION

BACKGROUND OF THE INVENTION

It has previously been proposed to prepare highly swelling polymers from unsaturated carboxylic compounds such as maleic anhydride by polymerizing the carboxylic monomer with a cross-linking agent such as a polyethylenically unsaturated compound as shown in U.S. Pat. No. 2,798,053. Such polymers have been employed as synthetic gums to produce mucilaginous or gel-like aqueous compositions.

It has further been suggested to employ solid linear copolymers of maleic anhydride and styrene in admixture with a substantial proportion of a polyhydric alcohol, as for example in U.S. Pat. No. 3,085,986, to produce thermoset molded resins wherein the final product is cross-linked by reaction of the polyhydric alcohol with the anhydride residues in the linear polymer. The products from this latter procedure are hard resins which absorb only minimal amounts of water or sodium chloride solution even after immersion therein for seven days.

It is known from U.S. Pat. No. 3,810,468 and Ser. No. 331,849, filed Feb. 12, 1973, that lightly cross-linked absorbent fibers can be prepared from copolymers of maleic anhydride and vinyl monomers wherein the crosslinking agent is a glycol or an alkylene diamine. However, these fibers are stiff and brittle.

SUMMARY OF THE INVENTION

In accordance with the present invention there is provided a water-insoluble, water-swellable derivative of a copolymer of maleic anhydride with at least one suitable vinyl aromatic monomer in a flexible fiber form. The invention further provides a novel method for preparing lightly cross-linked, ammonium salt derivatives of such vinyl monomer-maleic anhydride copolymers in fiber form.

In carrying out the invention, a copolymer of maleic anhydride with any suitable vinyl aromatic monomer such as styrene, vinyl toluene, t-butylstyrene or the like is dissolved in an organic solvent together with a small amount of a cross-linking agent and the resulting solution is forced through a die or spinnerette to produce filamentous fibers of the copolymer. Various conventional spinning techniques may be employed. For example, the solution of copolymer may be wet spun by extrusion into a coagulation bath containing a liquid which is a nonsolvent for the copolymer. Alternatively, and particularly where the copolymer is desired in monofilament form, a dry spinning technique may be employed wherein the solution of copolymer is extruded in filamentous form into air or other gas. In any case, following the fiber spinning step the copolymer fibers are heated for a period of time at somewhat elevated temperatures, for example, from about 50° to about 100°C. to dry the fibers and to complete the reaction of the cross-linking agent with the copolymer. Good results with respect to stability of gel capacity of the fibers have been obtained by employing a curing time of from about 12 to 24 hours at a temperature of about 100°C.

In preparing the fibers, it is essential that spinning be accomplished as soon as possible after the cross-linking agent has been introduced into the spinning solution since proper fibers cannot be obtained if the cross-linking reaction has proceeded to any substantial degree.

Following completion of the cross-linking reaction, the copolymer fibers are treated with ammonia to open the anhydride rings in the copolymer and convert same to a hydrophilic salt form. In one convenient mode of operation, the cross-linked fibers are cooled and immersed in liquid ammonia at atmospheric pressure. Alternatively, the cross-linked fibers are placed in an autoclave or other suitable pressure vessel maintained at a temperature below 20°C. and treated with gaseous ammonia under a pressure of from about 20 to 100 pounds per square inch (gauge). Following any of these treatments with ammonia, the fibers may be washed free of excess alkaline material with a suitable solvent such as anhydrous methanol, ethanol or the like.

DETAILED DESCRIPTION

The copolymer starting materials employed in the present invention are prepared in known procedures employing free-radical initiating polymerizaiton catalysts such as organic peroxides. Typical methods and reaction conditions are shown, for example, in U.S. Pat. Nos. 2,872,436, 3,423,355 and 3,423,373. Similar procedures are shown in *Encyclopedia of Polymer Science and Technology*, Volume 1, pages 80–84 (1964). Thus, for example, equimolar proportions of maleic anhydride and a suitable copolymerizable vinyl aromatic monomer are dissolved in an inert organic solvent such as acetone, methylethyl ketone, methylene chloride or benzene and a small effective amount of a peroxide catalyst such as tertiary butyl peroxypivalate is added after the monomer solution has been purged free of dissolved inhibitory oxygen by sparging with an inert gas such as nitrogen. The temperature of the reaction mixture is then raised to a reaction temperature of about 40°–50°C. and the reaction mixture is maintained at such temperature under a blanket of inert gas for a period of time to complete the polymerizaton reaction. It is desirable to adjust the reaction conditions to produce copolymers having molecular weights of at least about 50,000 and molecular weights of 100,000, or more are desirable. Preferred copolymers which can be readily spun into strong fibers have molecular weights of 1,000,000 or greater. When the reaction solvent is also a solvent for the copolymer product as is the case with acetone and methylethyl ketone, the product is obtained as a viscous solution of the copolymer in the ketone solvent and as such, with at most an adjustment of concentration by addition or removal of solvent, can be used directly as a fiber spinning solution with the mere addition of the desired quantity of a suitable cross-linking agent. On the other hand, when using benzene or methylene chloride as a reaction solvent in which the copolymer product is insoluble, the copolymer precipitates from the reaction medium and can be separated, for example, by filtration or decantation, and dried. Such copolymer products can then be dissolved as desired in a suitable spinning solvent for carrying out the further fiber-forming and cross-linking operations.

The cross-linking agents suitable for use in the preparation of the fibers of this invention are mixtures of trihydroxy mixed poly(oxy-ethylene-oxy-1,2-propylene)glycerol ethers. They are disclosed in U.S. Pat. No. 2,733,272 which is incorporated herein by reference. In general, these glycerol ethers have a molecular weight range from 500 to 6000 and have at least 8 oxyalkylene groups in each glycerol moiety. These cross-linking agents have the advantage that they plasticize as well as cross-link the copolymers.

The amount of cross-linking agent can be varied somewhat depending upon the gel capacity desired in the finished fibers provided only that sufficient cross-linking agent is employed to render the polymer fibers water-insoluble. In general, a cross-linking agent is added to the spinning solution of copolymer in the amount of from about 10 to about 40% by weight, preferably from about 20 to about 30% by weight, based on the weight of copolymer present.

The term "gel capacity" as employed in the present specification and claims is defined as the weight in grams of the swollen fibers which have imbibed an aqueous fluid to equilibrium capacity divided by the weight in grams of the dry polymer fibers employed.

Conventional equipment and methods for spinning fibers can be employed. In practice, the starting copolymer can be prepared in a spinning solvent such as acetone or methylethyl ketone employing proportions of monomers to solvent such that the resulting viscous solution of copolymer can be mixed with the appropriate amount of cross-linking agent and employed directly as a spinning solution. Alternatively, dry solid copolymer can be dissolved in a suitable solvent together with a cross-linking agent and employed for spinning fibers. Suitable solvents should dissolve a substantial amount of the copolymer, for example, from about 10 to about 50% by weight or more thereof and should also either be sufficiently volatile to be readily removed by evaporation from the fibers in dry spinning or should be soluble in the fluid employed as a coagulation bath for wet spinning. Suitable solvents include acetone, methylethyl ketone, N-methyl pyrrolidone and dimethylformamide. The concentration of copolymer employed in the spinning solution will vary depending on the nature of the solvent and the composition and molecular weight of the copolymer. It is important that the spinning solution have the proper viscosity for use in the extrusion equipment employed and the necessary concentration of copolymer to achieve the desired viscosity can readily be ascertained by a few preliminary tests over a range of concentrations. With low molecular weight copolymers, concentrations of up to 40 or 50% by weight in acetone have been employed to obtain the desired fiber-forming solution. Conversely, with high molecular weight copolymers, for example, with molecular weights of one million or more, concentrations as low as 10% by weight of copolymer in acetone have proved suitable.

In dry spinning, the solution of copolymer and cross-linking agent is extruded through a suitable die into a current of warm air or other gas whereby the solvent is evaporated and the fibers are obtained in the form of monofilaments. For wet spinning, the solution of copolymer and cross-linking agent are forced through a suitable spinnerette into a coagulation bath which sets the fibers. Water is a preferred liquid for use in the coagulation bath although any other inert liquid which is a nonsolvent for the copolymer may be employed. Good fiber formation has been obtained employing a chlorinated hydrocarbon such as methylene chloride or an aliphatic hydrocarbon such as pentane as the coagulating bath liquid. Good fibers have been obtained by extrusion into coagulation baths maintained at room temperature or somewhat lower, that is at temperatures of from about 15° to about 25°C.

Once the fibers have been formed, they may be stretched, and/or twisted or crimped in conventional fashion depending upon the ultimate use proposed therefor. Stretching is conveniently accomplished by transferring the freshly formed fibers from the coagulation bath directly into a water bath at a temperature of about 90°C. and applying stretching tension by adjusting the speed of take-up rolls or the like. Following any such conditioning steps, the fibers are conveniently taken up on rolls, dried and heated for a period of time to complete the cross-linking reaction. Thereafter the fibers are treated with ammonia or alkali metal hydroxide or both in the manner set forth above to convert same to the salt form and thereby provide the desired property of water swellability.

The finished water-insoluble, water-swellable fibers are adapted to a variety of uses. For example, the flexible fibers can be woven into filter cloths and employed to remove small amounts of water dispersed in liquid hydrocarbons. Primarily, the fibers are used in the fabrication of absorbent layers for sanitary products such as bed pads, diapers, sanitary napkins and the like. Such layers can be in the form of woven or non-woven fabrics, air-laid fibers or a mixture of said fibers with cellulosic fluff or the like. In such use, the water-swellable fibers can absorb and bind many times their weight of a body fluid or exudate and hold same against the pressures encountered in normal use. For such purposes the water-swellable fibers are superior to the cellulosic fluff or wadding commonly employed in such sanitary products.

The following examples illustrate the invention but are not to be construed as limiting.

EXAMPLE 1

408 grams Of maleic anhydride (4.16 mol) was dissolved in 2000 ml acetone under vigorous $N_2$ purge. 416 grams of styrene (4.0 mol) in 1000 ml acetone was added and the mixture was purged with nitrogen for 15 minutes. Then 2.0 ml of Lupersol 11 (t-butyl peroxy pivalate) was added and polymerization carried out at 50°C. for 23 hours to yield a very viscous solution of 29% solids.

EXAMPLE 2

The viscous solution or dope prepared in Example 1 (44.7 gms) was diluted with 10 ml of acetone and blended with 1.3 gms (10 weight percent based on the weight of polymer) of a mixture of trihydroxy mixed poly(oxyethylene-oxy-1,2-propylene)ether of glycerol having about 80 mole percent ethylene oxide and 20 mole percent propylene oxide and having a molecular weight of about 4500. This blend was then extruded, at 50 pounds per square inch, through a 100 hole spinneret having 3.5 mil holes into a cool water bath to obtain the copolymer in the form of fine filaments.

The fibers were then cured at 110°C. for 18 hours and converted to the ammonium-amide salt form by treatment of the fibers with gaseous ammonia for 20 hours.

The gel capacity of the fibers was tested and the results are set forth in Table I along with other examples using various amounts of the same cross-linker and acetone.

TABLE I

| Example | Weight of dope (gms) | Acetone added (ml) | Weight percent cross-linker | Gel Capacity[2] in water | Gel Capacity[2] in salt solution[3] |
|---|---|---|---|---|---|
| 2 | 44.7 | 10 | 10 | 119 | 22 |
| 3 | 30.3 | 15 | 15 | 62 | 17 |
| 4[1] | 30.7 | 15 | 20 | 121 | 21 |
| 5[1] | 44.0 | 20 | 25 | 79 | 20 |

[1] cured for 5 hours instead of 20 hours, extruded at 40 p.s.i.
[2] gel capacity defined as weight in grams of swelled fibers divided by weight in grams of the dry fibers
[3] a 0.27 N sodium chloride water solution to simulate urine When the above examples are repeated using equivalent amounts of ethylene glycol or glycerine as the cross-linking agent, the fibers are stiff and brittle.

The advantages of the present invention are that the present fibers can be carded and twisted into a yarn without breaking whereas the known fibers cannot be so used.

While we do not wish to be bound by any particular theory, it is believed that the reaction of ammonia with the anhydride copolymers produces a water-swellable product containing equimolar proportions of amide groups and ammonium salt groups.

I claim:

1. As an article of manufacture a water-insoluble, water-swellable flexible polymeric fiber composed of the ammonium salt form of a copolymer of maleic anhydride with a vinyl aromatic monomer copolymerizable therewith, said copolymer having been cross-linked by reaction with from about 10 to about 40 percent by weight of the copolymer of a cross-linking agent consisting of a mixture of trihydroxy mixed poly-(oxyethylene-oxy-1,2-propylene) ethers of glycerol.

2. An article according to claim 1, wherein the copolymer is a copolymer of maleic anhydride and styrene.

3. An article according to claim 1 wherein the cross-linking agent is a mixture of trihydroxy mixed poly(oxyethylene-oxy-1,2-propylene)ethers of glycerol in which the oxyethylene groups represent from about 20 to about 80 mol percent of the total oxyalkylene groups.

* * * * *